United States Patent
Kluge (10) Patent No.: US 8,303,216 B2
(45) Date of Patent: Nov. 6, 2012

(54) LAYING DEVICE

(75) Inventor: Jens Kluge, Petershagen-Eggersdorf (DE)

(73) Assignees: Doppelacker GmbH, Petershagen-Eggersdorf (DE); Technische Universität Dresden, Dresden (DE)

( * ) Notice: Subject to any disclaimer, the term of this patent is extended or adjusted under 35 U.S.C. 154(b) by 216 days.

(21) Appl. No.: 12/789,475

(22) Filed: May 28, 2010

(65) Prior Publication Data

US 2010/0310320 A1  Dec. 9, 2010

(30) Foreign Application Priority Data

May 29, 2009  (DE) .................. 10 2009 024 323

(51) Int. Cl.
*F16L 1/028* (2006.01)
*H02G 1/06* (2006.01)
(52) U.S. Cl. .................. 405/178; 405/180; 405/182
(58) Field of Classification Search ............... 405/154.1, 405/174, 178, 180, 182, 184.5
See application file for complete search history.

(56) References Cited

U.S. PATENT DOCUMENTS

| | | | | |
|---|---|---|---|---|
| 3,339,369 A * | 9/1967 | Ryan | ............................. | 405/176 |
| 3,354,660 A * | 11/1967 | Vaughan | ........................ | 405/174 |
| 3,802,210 A * | 4/1974 | D'Andrea | ...................... | 405/178 |
| 3,849,999 A * | 11/1974 | Coffey | .......................... | 405/178 |
| 3,851,489 A * | 12/1974 | Richardson | ................... | 405/178 |
| 3,926,004 A * | 12/1975 | Baylor | .......................... | 405/178 |
| 3,931,717 A * | 1/1976 | Schuck | ......................... | 405/178 |
| 4,332,511 A * | 6/1982 | Bradley et al. | ................ | 405/178 |
| 4,629,363 A * | 12/1986 | Rose et al. | ..................... | 405/178 |
| 4,637,755 A * | 1/1987 | Tollefson et al. | ............. | 405/180 |
| 5,433,277 A * | 7/1995 | Davison | ........................ | 405/182 |
| 5,913,638 A * | 6/1999 | Lansdale | ....................... | 405/180 |
| 7,524,142 B2 * | 4/2009 | Scott | .............................. | 405/178 |
| 7,637,697 B1 * | 12/2009 | Holland | ........................ | 405/180 |
| 2006/0051163 A1 * | 3/2006 | Hagberg | ....................... | 405/180 |

FOREIGN PATENT DOCUMENTS

| | | |
|---|---|---|
| DE | 4210858 | 10/1993 |
| DE | 19623922 | 2/1998 |
| DE | 19928683 | 1/2001 |

* cited by examiner

*Primary Examiner* — Frederick L Lagman
(74) *Attorney, Agent, or Firm* — Gudrun E. Huckett (57) ABSTRACT

A laying device simultaneously lays at least two substantially parallel and axially spaced apart groups of flexible media lines in at least one flat layer in the soil, wherein each group of flexible media lines has at least one flexible media line. The laying device has a cutting device for generating at least one slot in the ground. The cutting device has one or more substantially vertical blades and a substantially horizontal blade connected to a lower end of the one or more vertical blades, or the cutting device, viewed in the cutting direction, has a round, semi-circular, oval, polygonal or Y-shaped configuration. At least two devices for dispensing the groups of media lines are arranged on the side of the laying device that is facing away from the cutting direction.

21 Claims, 9 Drawing Sheets

LAYING DEVICE

BACKGROUND OF THE INVENTION

Subject matter of the present invention is a laying device that makes it possible to lay simultaneously at least two groups of flexible media lines in a surface-near area axially horizontally spaced apart and parallel to one another, wherein the laying device comprises a cutting device for generating a slot in the ground and the cutting device is moved through the ground wherein, viewed in the movement direction, devices for dispensing the groups of flexible media lines are arranged behind the cutting device.

The prior art discloses several laying devices. For example, usually slots are generated in the ground and at the bottom thereof one or several cables or media lines are laid. Corresponding solutions are disclosed, for example, in DE 42 10 858 C2 or DE 199 28 683 C2. Known are also solutions in which a pipe is introduced into a slot that has been generated by means of a blade wherein at the same time also a warning band and a control line are laid above the laid pipe into the soil (DE 196 23 922 C2). Known manufacturers of such laying devices are, for example, the company Walter Föckersberger GmbH or Lancier Cable GmbH.

All these solutions have in common that with a blade-like device a single vertical slot is generated in the ground and lines are placed directly adjacent to one another so that they contact one another at least partially or are placed vertically spaced apart, in the projection onto the ground surface, directly above one another at a spacing in the single slot. These devices are suitable only to a limited extent to produce a flat laying pattern of lines because for each laying row one pass across the laying area is to be performed.

SUMMARY OF THE INVENTION

It is therefore the object to provide a laying device that is suitable to produce in the underground an effective flat laying action of media lines.

The device has a cutting device that generates a slot in the ground that extends not only vertical in contrast to what is disclosed in the prior art. The slot is generated in the ground such that the cutting device in the laying direction is moved therethrough. The cutting device cuts thus through the body of the soil (ground). The cutting device has at the side (rear) opposite the laying device devices for dispensing through which the media lines are introduced into the slot. In this connection, two or more groups of media lines are introduced into the ground in at least one flat layer. The groups of media lines extend parallel to one another but are axially spaced apart, i.e., between two groups of media lines there is a spacing that corresponds at least to the diameter of the thickest media line of the two groups. Each media line group contains at least one media line. The term "cutting direction" relates to the direction in which the blade is being moved. It is identical to the laying direction.

In the following, the term "media lines" includes the property to represent a group of same or different media lines.

The media lines are advantageously elastic and can be bent up to a certain bending radius. The bending radius depends on the type and material of the media lines.

With the configuration according to the invention of the laying device several media lines can be laid parallel to one another. In this way, the cutting surface/the ground engagement for flat laying pattern of media pipes, as it may be required, in case of drainage pipes or heat exchanger pipes in the ground, is greatly reduced. The cutting forces but also the destruction of the grown soil structure in comparison to laying with currently known cable plows are significantly reduced. In this way, agriculturally used areas in which near the ground surface heat exchanger pipes for harvesting surface-near agro-thermal energy have been installed can be utilized without limitation without this causing lasting damage of the soil structure that has grown over long periods of time. Moreover, fewer travel cycles are required in order to install pipes across the entire area to be worked in an ecologically advantageous way.

As illustrated, the shape of the cutting device determines the shape of the slot produced in the ground. The shape of the cutting device depends on the number and spatial position of the media lines to be laid.

The shape of the cutting device in the following is described as a projection onto a plane that is perpendicular to the cutting direction.

Advantageously, the cutting device has at least one vertical blade having arranged at its lower end a second horizontal blade. The resulting slot has the shape of a horizontal baseline with a vertical line positioned centrally above. The second horizontal blade advantageously comprises at least two devices for dispensing the media lines.

In an also preferred embodiment, the cutting device has two vertical blades that at their lower ends are connected to a third horizontal blade. The resulting slot has the shape of a rectangle that is open at the top. The third horizontal blade has advantageously at least two devices for dispensing the media lines.

In a preferred embodiment, precutting of the soil body with a precutting device is provided wherein the precutting device has corresponding blades whose arrangement corresponds to that of the blades of the cutting device. In a further preferred embodiment, the precutting device does not have for each blade of the cutting device a corresponding blade. The precutting device precuts the ground in particular at locations that are cut by the blades of the cutting device. The precutting action causes the ground to be already loosened and the blades of the cutting device thus experience less resistance.

For example, the ground in front of the cutting device is pre-loosened by two vertical blades. They cut the soil body at least partially at a spacing that corresponds to that of the trailing blades of the cutting device wherein the trailing blades are connected by a third horizontal blade that then dispenses the media lines.

In a preferred embodiment during the (pre)cutting action of the soil body a physical soil examination (detection) of the soil is carried out. This is done by means of sender/receiver combinations. Each sender has correlated therewith at least one corresponding receiver. It is possible to employ reflectively operating (reflecting) as well as transflectively operating (penetrating) sensors. In case of the reflectively operating detectors, sender and receiver are preferably closely positioned to one another and the receiver detects the signals of the sender that are reflected by an obstacle. In case of the transflective operating mode, sender and receiver are spatially separated and the obstacles are detected that, along the signal path from the sender to the receiver, cause signal interruption or significant signal weakening. The detection is preferably directed to recognizing obstacle bodies (stones, foundation remains, cables, pipelines, and other deposits) in the ground. For this purpose, for example, on the spaced apart blades of the cutting device and/or, should it be employed, of the precutting device sensors with sending and/or receiving units are arranged. The detection covers the space between the blades as well as the surrounding space at the sensor-specific detection depth. Particularly the space that is to be passed by the horizontal blades requires exploration. This is preferably a depth of 1.75 m to 2.25 m.

In a preferred embodiment, on one blade of the precutting device a sender and on a second blade a receiver is arranged. In a further preferred embodiment the sender or receiver is arranged on the blades of the cutting device and/or the precutting device while the matching receivers and senders are arranged on one or several further parallel operated precutting devices and/or cutting devices. They can move in the same direction or opposite direction parallel to one another.

In a further preferred embodiment the senders or receivers are arranged on the blades of the cutting device and/or the precutting device while the corresponding receivers or senders are positioned at stationary measuring sites on the ground and/or at a certain soil depth.

In an alternative embodiment the bottom is screened with respect to obstacles by means of radar sensors arranged at the ground surface.

The blades are advantageously embodied in a wedge shape in the moving direction in order to facilitate penetration of the soil.

In a further preferred embodiment, the cutting device has a curved, semi-circular or oval shape. The devices for dispensing the media lines are now arranged symmetrical to a vertical line that extends from the soil surface to the lowest point of the cutting device. In this way, layers are produced in which the media lines are laid parallel to one another and axially spaced apart, wherein the axial spacing of the media lines of one layer increases in the direction toward the soil surface.

In a further preferred embodiment, the cutting device has a polygonal configuration. The cutting device is advantageously symmetrically embodied relative to a plane that is perpendicular to the soil surface in the cutting direction. The devices for dispensing the media lines are also symmetrically arranged relative to this plane. The laying action therefore produces layers in which the media lines extend parallel to one another and axially spaced apart.

A further preferred embodiment has a blade construction that has the shape of an upside-down "Y". In this connection, on a vertical blade two further blades are attached that are positioned at an obtuse angle to the horizontal blade.

Advantageously, for circumventing obstacles or for reaching the laying depth, the horizontal and vertical slant of the cutting devices or of parts of the cutting devices (for example, the blades) can be changed. The cutting device has advantageously auxiliaries for improved penetration of the soil. For this purpose, in a preferred embodiment the cutting device has devices that load the cutting device with vibrations, oscillations or shaking movements. In a further preferred embodiment, friction-reducing means are applied in the area of the blades of the cutting device (water, emulsions).

Advantageously, before starting work, at the edge of the area to be worked a trench is produced which with respect to its depth corresponds at least to the depth of use of the laying device. Such a trench is referred to as a "head trench". The laying device is then placed into the head trench and the media lines are then laid immediately at the desired depth. The laying device can perform within the same area several laying processes at different soil depths so that several layers of media lines are arranged above each other within the ground. In this connection, first the layer at the greatest soil depth is formed and subsequently with several laying passes the next higher layer is positioned, respectively. When the media lines extend with sufficient projection into the trench, the projecting end of the media lines can be guided out of the trench and can be connected comfortably at the surface to a collecting line. Subsequently, the collecting lines, optionally with introduction of a suitable sand bed, are placed onto the bottom of the trench and the head trench is filled.

The laying device has a part that projects upwardly past the soil surface and is engaged by the traction means for moving the laying device. Advantageously, the supply of media lines to the laying devices is realized through the interior of the cutting device. The part of the cutting device projecting upwardly from the ground has in this connection one or several openings through which the flexible media lines can be passed into the interior of the cutting device. In the cutting device, the media lines are guided individually or together to the respective devices for dispensing them into the ground. This enables a tension-free laying action because no significant traction forces act on the media lines.

In a preferred embodiment, the force for movement of the laying device is provided by a tractor such as a crawler tractor or a large tractor that pulls or pushes the laying device. However, also the use of a cable traction device or a special device for movement of the laying device is possible. Preferably, the blades of the precutting device are arranged at the front side, viewed in the movement direction, and the blades of the cutting device are arranged at the rear side of the laying device.

In a further preferred embodiment, the precutting device and the cutting device are moved by separate traction means. For example, the precutting device during precutting of the ground can perform the physical soil exploration and, after evaluation of the results, the cutting device is used and the media lines are laid wherein advantageously the obstacles in the ground can be circumvented.

In a preferred embodiment, the movement of the laying device is carried out by traction along the projected laying direction. The thus required force is advantageously applied by means of a hydraulic traction system (hydro cylinder), electro-mechanically (spindles), hydro-mechanically (double-acting hydro cylinder) or by a cable winches and acts by means of chains or cable pulls onto the laying device. This movement by means of external anchored traction means can also be used for assisting the movement provided by a crawler or a tractor.

In a further preferred embodiment, the advancing movement of the laying device is discontinuous. Advantageously, a cycle of advancement of the traction means —anchoring of the traction means—advancement of the laying device is maintained.

In this connection, the traction force must be applied at least partially by the traction means. However, there is no danger that the driving wheels or chains of the traction means for great resistance in the ground will lose their ground traction. Anchoring of the traction means can advantageously be realized by positioning ground anchors, lowering a push plate on the traction means or lowering a profiled ground plate. In a preferred embodiment, a walking system is used that anchors itself in the ground by means of lowerable supports.

Advantageously, the laying device has guiding devices on the ground surface that ensure that the orientation of the cutting device and the laying action of the media lines is realized at the desired depth and that the cutting device will not stall within the ground because of a horizontal slant that is too great or will not rise to the soil surface by a horizontal slant that is too small.

In a preferred embodiment, the control of the laying device is realized by means of the traction device. Advantageously, a directional correction of the traction device is achieved by pivoting action of the blades. In this connection, the vertical blades are preferably pivotable about a vertical axis and the horizontal blades are preferably pivotable about a horizontal axis. For parallel-guided blades the guiding movement is transmitted onto both blades uniformly in order to avoid spreading forces or compression forces between the blades.

In a preferred embodiment, the cutting device is arranged on a support device that is attached, in turn, on a traction means. The traction means is provided with the option of pivoting the support device. A guiding movement can thus be realized by pivoting the support device and/or pivoting the vertical blades. A correction of the laying depth is preferably realized in that the horizontal blades are pivoted. In a further preferred embodiment, the laying depth is changed in that the supporting device is positioned at a slant. Since the horizontal blade is arranged in a defined position relative to the support device, the slant of the horizontal blade is changed also in this way. The adjustable laying depth not only makes it possible to circumvent obstacles present in the ground but also makes it possible to reduce the laying depth at predetermined laying positions. This can be used advantageously in order to connect connectors to the laid media lines at laying positions at reduced depth. For example, large areas can be laid in a single process and by parallel arrangement of laying positions with reduced depth these laying positions can be connected with one another by head trenches and in the head trenches collecting lines can be introduced. The area that is thus laid with media lines can therefore be divided into individual fields.

In a preferred embodiment, the laying device carries ready-made media lines in prepackaged units such as cable drums or exchangeable cassettes during the laying process. These prepackaged units can be easily and quickly exchanged and accelerate the working process. Advantageously, such a prepackaged unit contains approximately 100 m of ready-made media lines, respectively, which corresponds to the average laying length of a laid field.

Typical laying depths of the media lines are between 0.5 m and 3.0 m in order to limit the required force for movement of the laying device that becomes greater with increasing laying depth. Advantageously, with the laying device heat exchanger tubes are laid as media lines that are used for collecting thermal energy from the ground.

DESCRIPTION OF PREFERRED EMBODIMENTS

The Figures represent preferred embodiments and results of use of preferred embodiments of the device according to the invention without limiting the invention to these embodiments.

Figure 1:
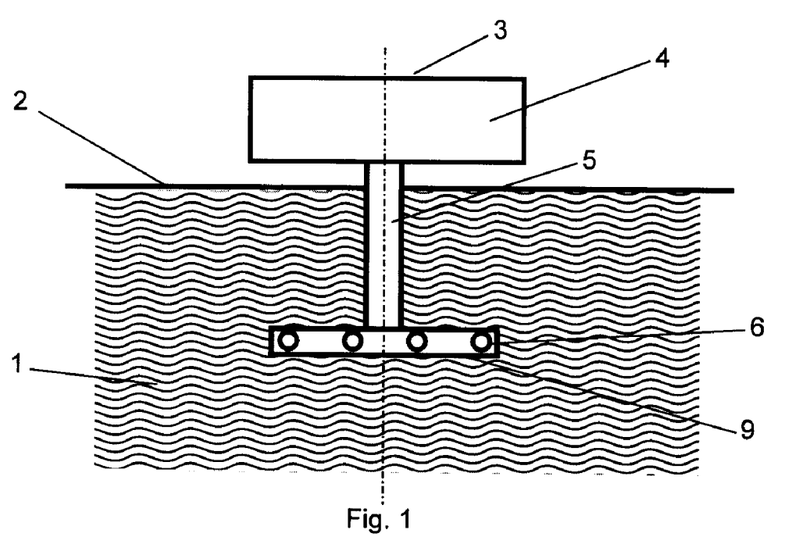
FIG. 1 shows the principal illustration of the configuration of an inventive laying device.

FIG. 1 shows the principal illustration of the configuration of the laying device (3), comprising a vertical blade (5) and a horizontal blade (9). The movement direction of the device extends perpendicularly into the illustration plane. On the horizontal blade (9) four identical devices (6) for dispensing the media lines are arranged (here for individual axially spaced apart media lines).

Figure 2:
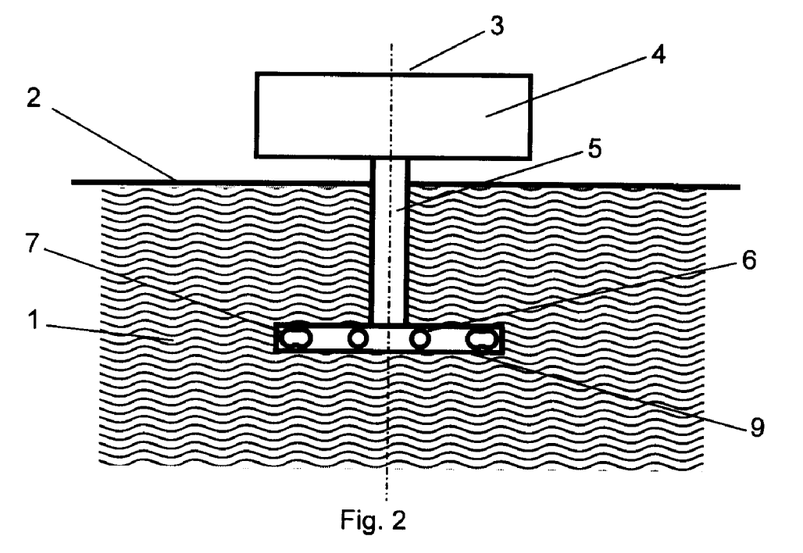
FIG. 2 shows the principal illustration of a variant of the inventive laying device according to FIG. 1.

FIG. 2 shows the principal illustration of a laying device (3) as in FIG. 1. Only the two outer devices (7) for dispensing the media lines are designed for two parallel media lines that are not spaced apart. The two inner devices (6) are designed for dispensing individual media lines.

Figure 3:
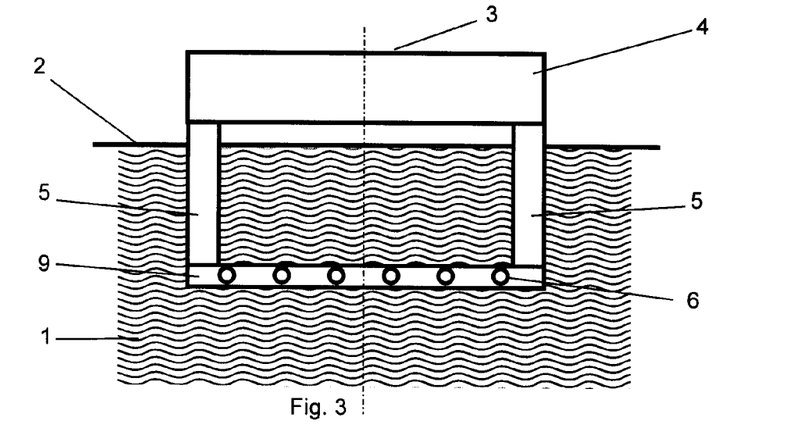
FIG. 3 shows the principal illustration of a further embodiment of the inventive laying device in an illustration as in FIG. 1.

FIG. 3 shows the principal illustration of the configuration of a laying device (3) with two vertical blades (5) and a horizontal blade (9). The movement direction of the device extends perpendicularly into the illustration plane. On the horizontal blade (9) six identical devices for dispensing the media lines are illustrated (here for individual axially identically spaced media lines).

Figure 4:
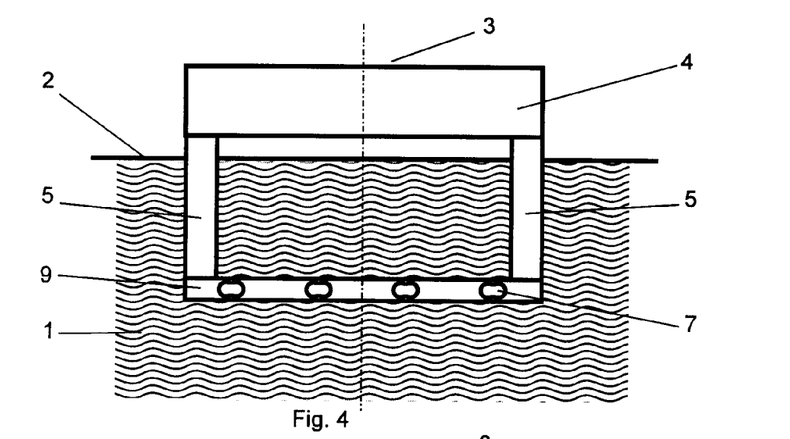
FIG. 4 shows the principal illustration of a variant of the inventive laying device according to FIG. 3.

FIG. 4 shows the principal illustration of a laying device (3) as in FIG. 3. The horizontal blade has in this embodiment four devices for dispensing the media lines wherein each device dispenses two parallel media lines that are not spaced apart.

Figure 5:
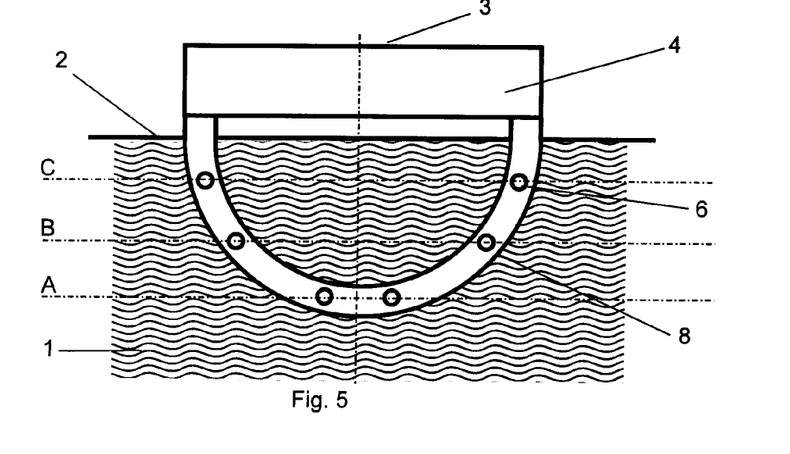
FIG. 5 shows the principal illustration of a further embodiment of the inventive laying device in an illustration as in FIG. 1.
Figure 6:
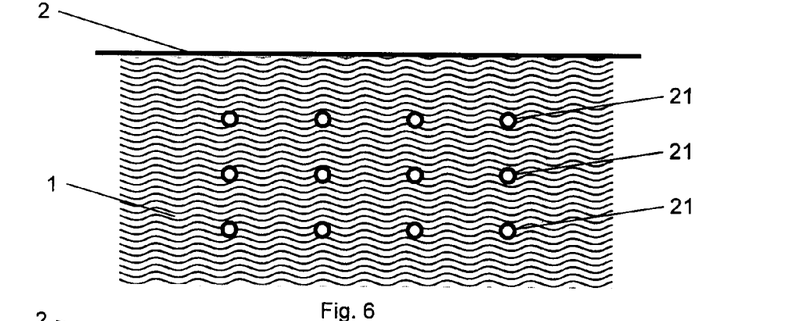
FIGS. 6 to 9 show various patterns that are being produced by the media lines after several uses of the device according to the invention in the soil, shown in section through the ground.
Figure 7:
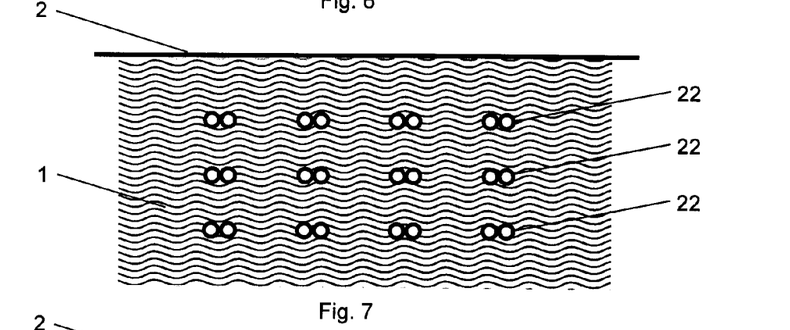
Figure 8:
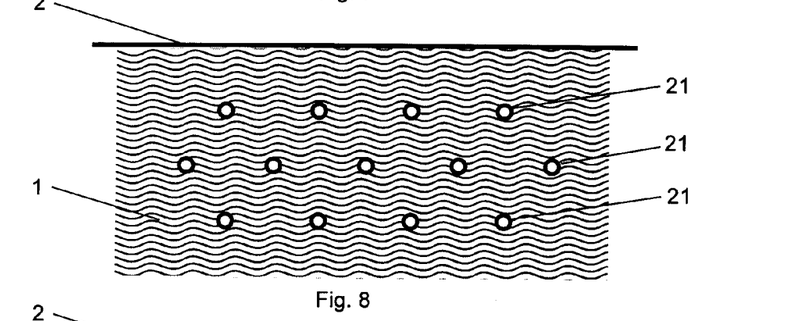
Figure 9:
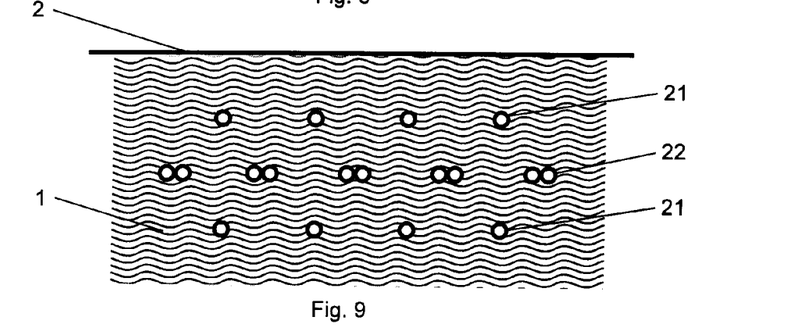

FIG. 5 shows the principal illustration of a laying device with semi-circular cutting device. Three laying planes (A, B, C) in the soil (1) below the soil surface (2) are produced.

FIGS. 6 to 9 show patterns that are formed in the ground by the media lines after several uses of the device according to the invention. The illustration shows a section through the ground wherein the prior movement direction of the laying device extends perpendicularly to the illustration plane. In this way, it is possible to arrange groups of media lines that have only a single media line (21) as well as those with several media lines (22).

Figure 10:
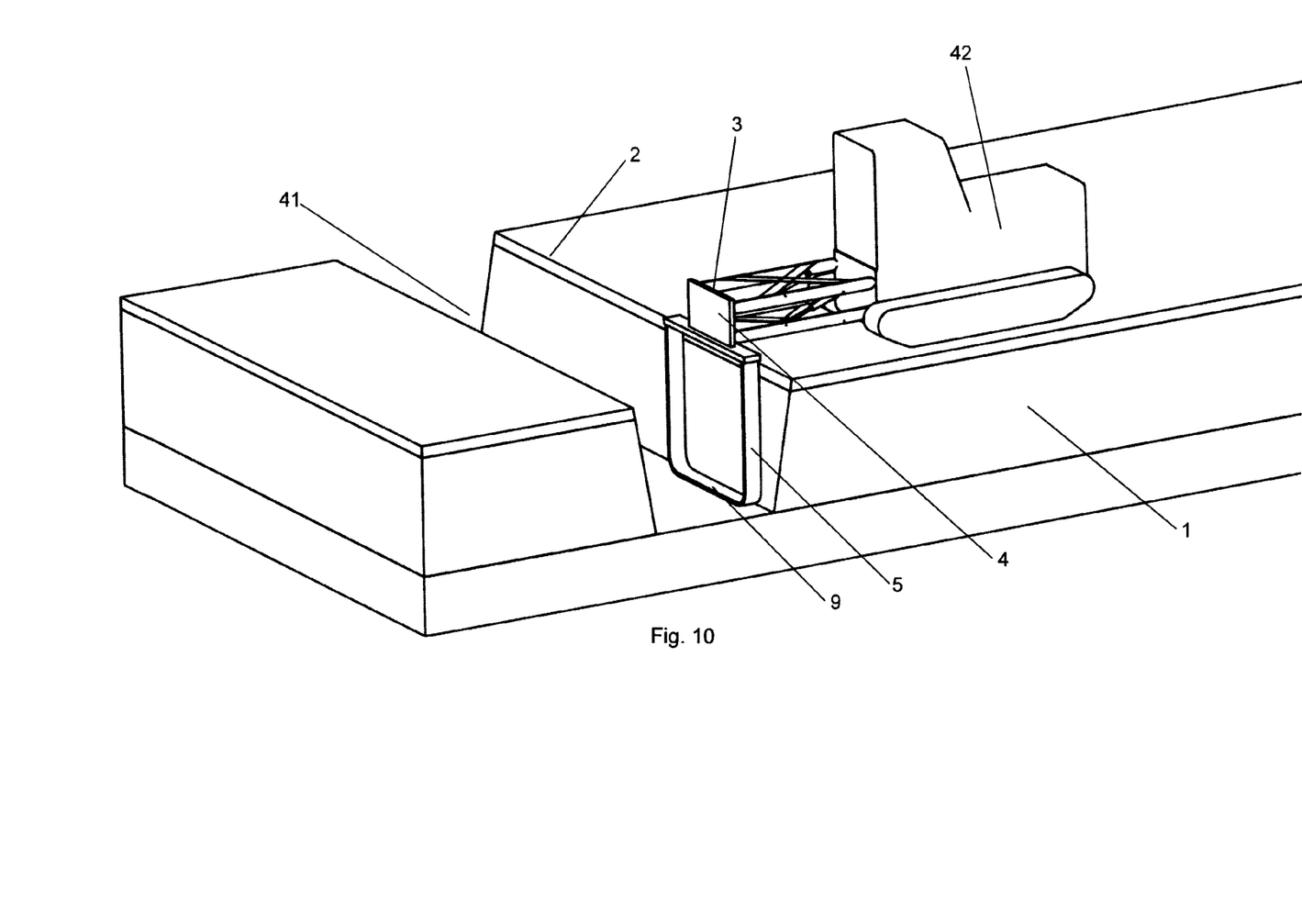
FIG. 10 shows the use of a laying device in a trench.

FIG. 10 represents the use of the laying device (3) in a trench (41). It is a laying device with two vertical blades (5) and a horizontal blade (9). The tractor (42) applies the force through the above-ground part (4) of the laying device into it (the illustration of the devices for dispensing the media lines, the prepackaged units of media lines as well as the media lines themselves are not illustrated herein).

Figure 11:
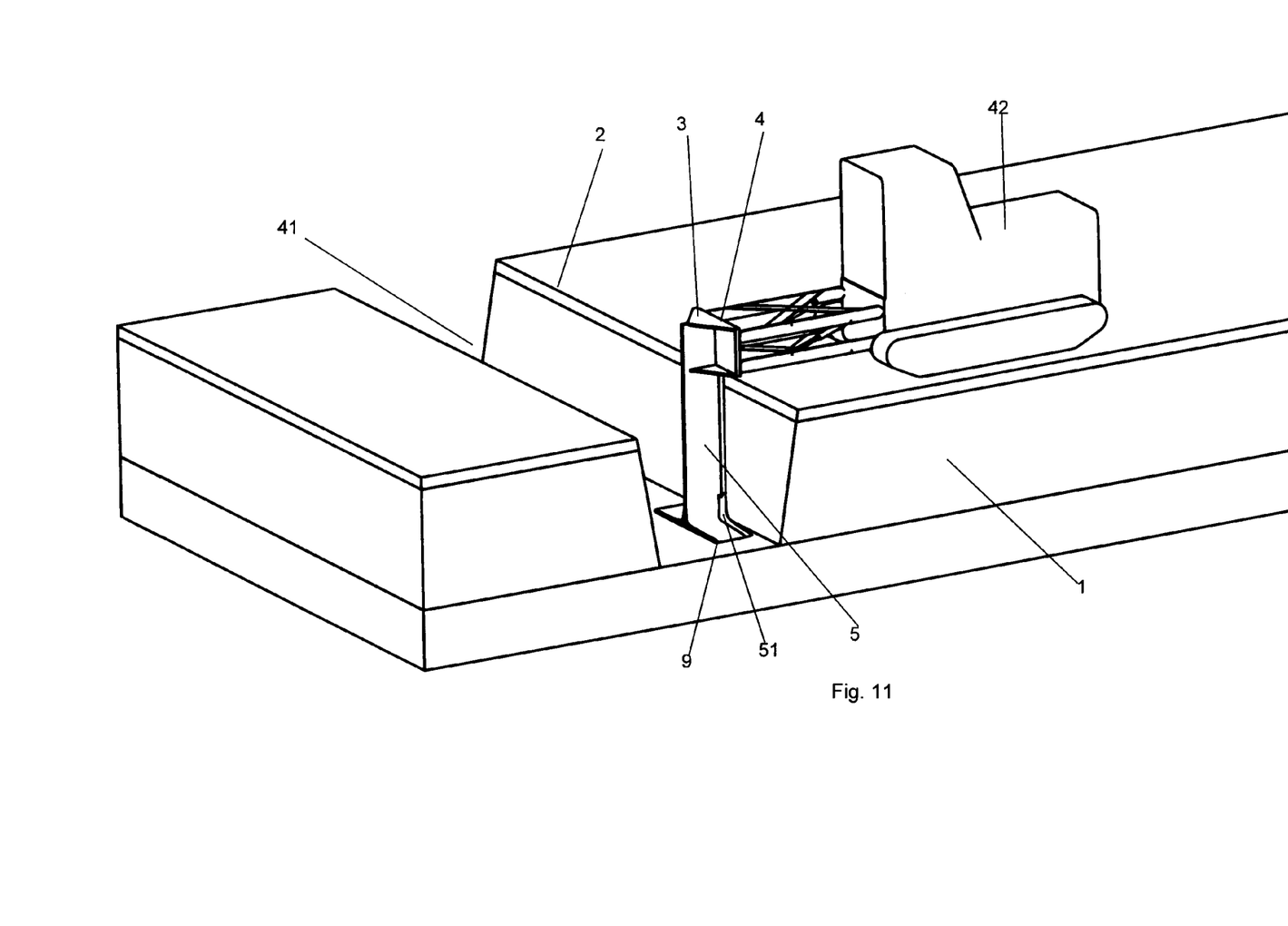
FIG. 11 corresponds to the illustration of FIG. 10 with the difference that a laying device with a vertical blade and a horizontal blade is illustrated.

FIG. 11 corresponds to the illustration of FIG. 10 with the difference that a laying device with a vertical blade (5) and a horizontal blade (9) is used. The wedge-shaped configuration (51) of the blades in movement direction is also illustrated.

Figure 12:
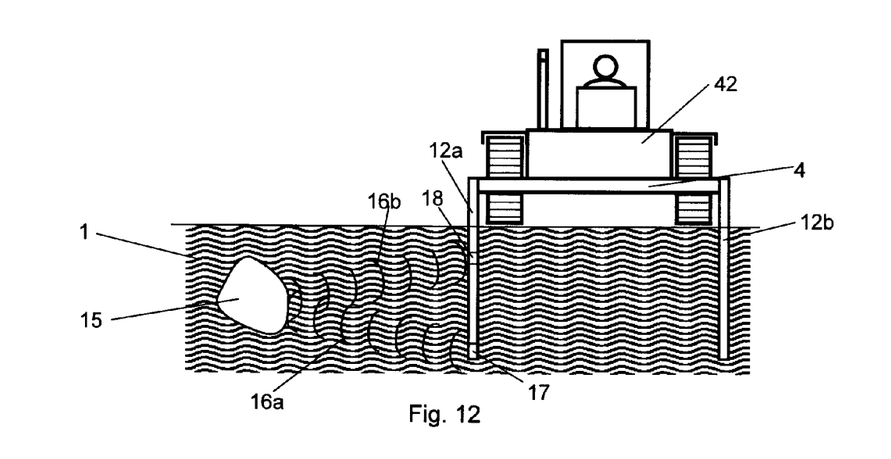
FIG. 12 shows the physical soil exploration during precutting.

FIG. 12 shows the physical soil exploration during precutting. A reflective exploration method is illustrated in which the sender (17) emits a wave-shaped signal (16a) (sound or electro-magnetic waves). The signal (16a) is reflected at the obstacle (15) and travels as a reflected signal (16b) to the receiver (18). The sender (17) as well as the receiver (18) are arranged on the left blade (12a) of a cutting device or alternatively above the ground surface.

Figure 13:
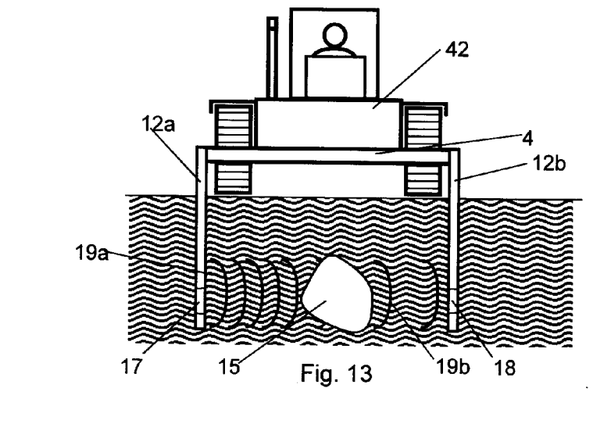
FIG. 13 shows an embodiment of the transmissive physical soil exploration.

FIG. 13 shows an embodiment of the transmissive physical soil exploration. The sender (17) is arranged on the left blade (12a) and the receiver (18) on the right blade (12b) of the precutting device. The impinging wave (19a) is partially absorbed by the obstacle (15) or reflected and travels after passing the obstacle as a weakened wave (19b) to the receiver (18). In this variant, in particular obstacles are detected that are located on the predetermined movement line of the horizontal blade.

Figure 14:
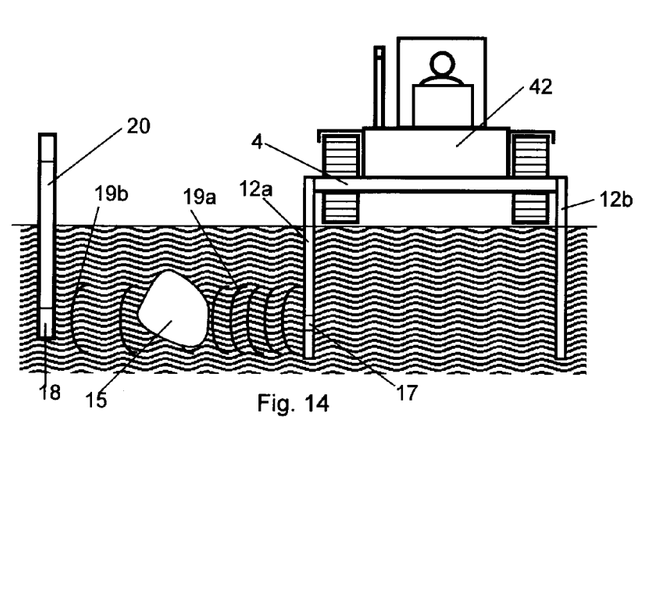
FIG. 14 shows a further variant of the transmissive physical soil exploration.

FIG. 14 shows a further variant of the transmissive physical soil exploration. From the sender (17) on the left blade (12a) of the precutting device the wave (19a) travels to the obstacle (15) where it is partially reflected and absorbed. The weakened wave (19b) reaches the receiver (18) at the stationary measuring site (20). Size and location of the obstacle (15) can be determined based on the signal travel that is detected by the measuring location (20).

Figure 15:
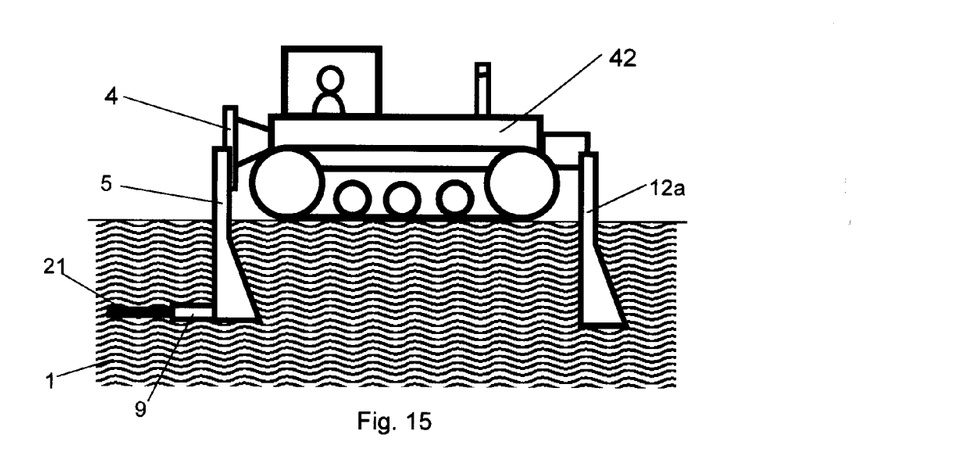
FIG. 15 shows a mobile traction means having at its front end a precutting device with a right vertical blade wherein a further vertical blade as a result of the illustration is hidden.

FIG. 15 shows a mobile traction means (42), here a crawler, having on its front end (in the movement direction) a precutting device with a right vertical blade (12a). A further vertical blade (12b) is hidden because of the illustration. At the rear of the mobile traction means (42) the laying device is arranged by means of a support device (4) (part for engagement of the pushing or pulling force). The supply roll of media lines and their supply means are not illustrated for reasons of simplification of the drawing. The laying device has a horizontal blade (9). It dispenses the media lines (21). The illustrated vertical blade (5) covers a further vertical blade (5). The two vertical blades (5) extend within the soil areas that have already been slotted by the vertical blades (12a, 12b) of the precutting device at the same location.

Figure 16:
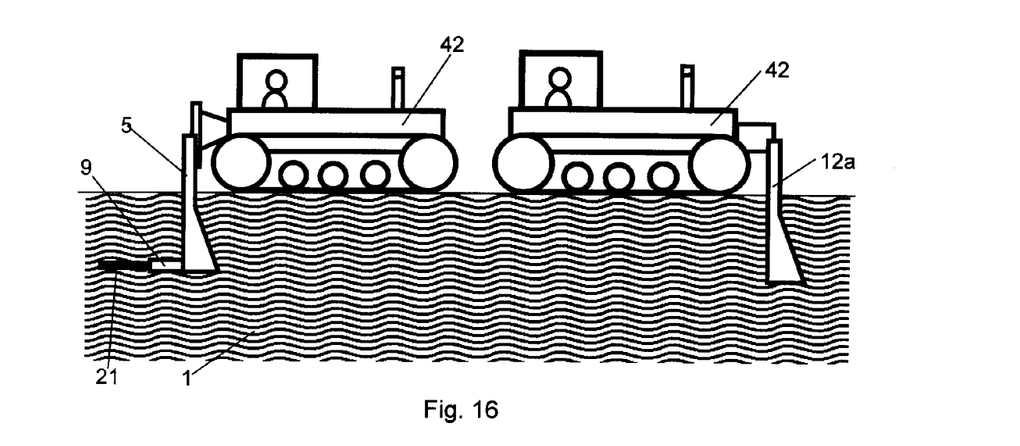
FIG. 16 shows how the precutting device and laying device are arranged on separate mobile traction means.

FIG. 16 shows the precutting device and the laying device arranged on separate mobile traction means (42). The use of the precutting device and of the laying device can be done at different times.

Figure 17A:
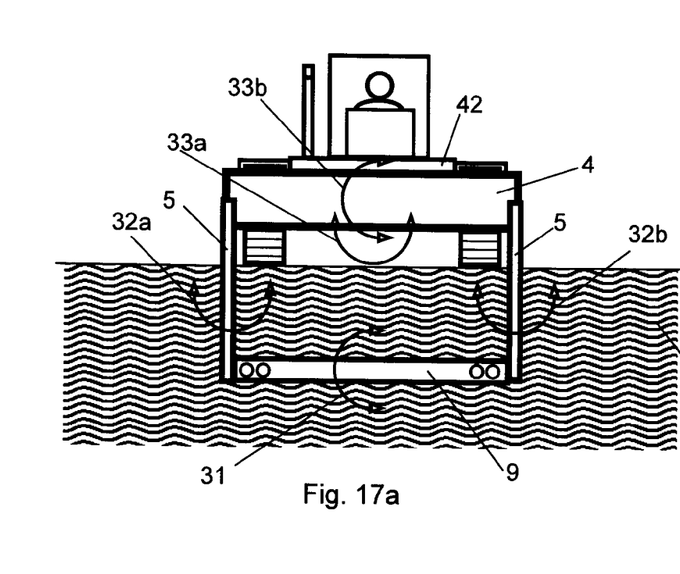
FIGS. 17a and 17b shows the pivot and slant possibilities of the blades and the support device of the laying device.
Figure 17B:
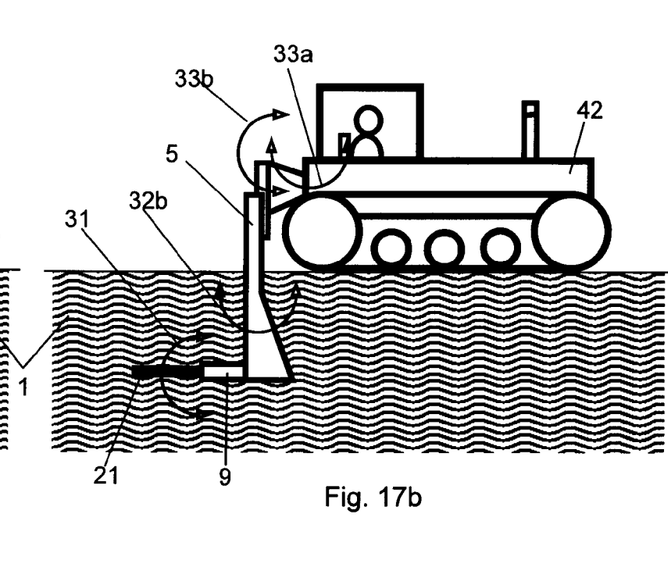
Figure 18:
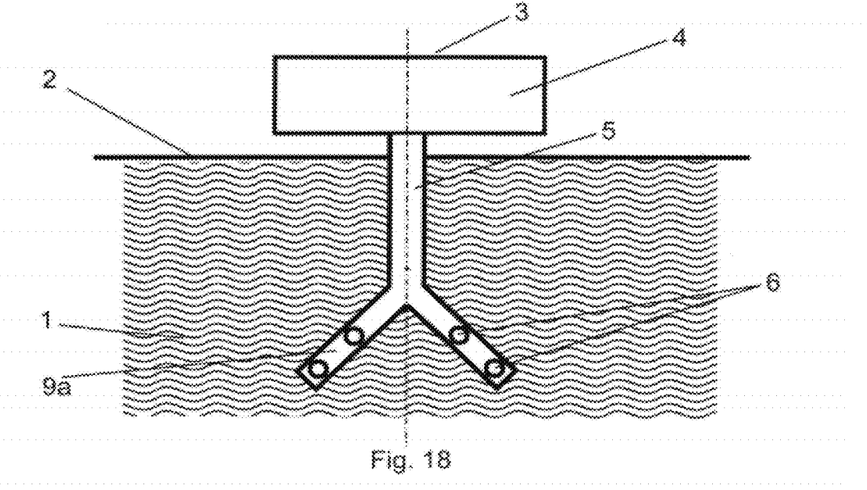
FIG. 18 shows a Y-shaped configuration of the cutting device (9a).
Figure 19:
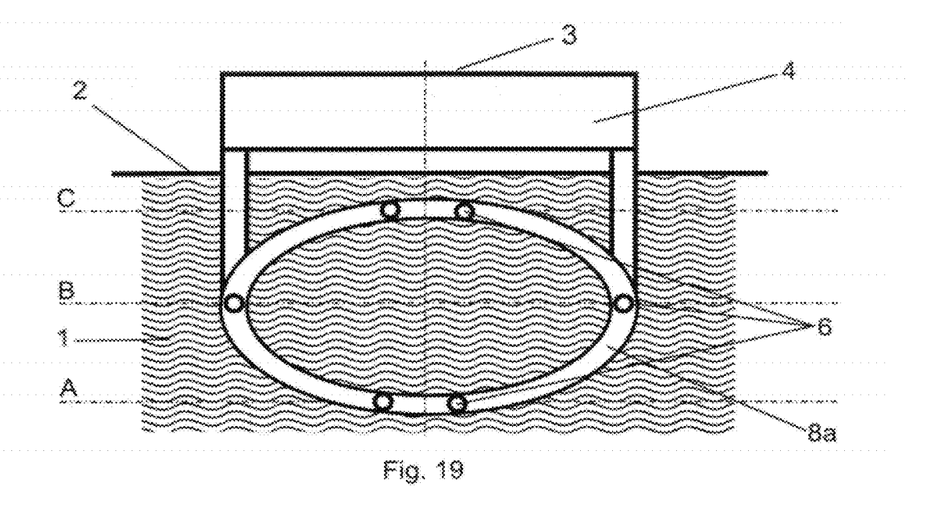
FIG. 19 shows an oval configuration of the cutting device (8a) with three laying planes (A, B, C).

FIGS. 17a and 17b show the pivot and slant possibilities of the blades and of the support device (4) of the laying device. The vertical blades (5) are pivotable about vertical axes (32a) and (32b). The horizontal blade (9) is pivotable about a horizontal axis (31). The support device (4) can be positioned at a slant about a vertical axis (33a) as well as a horizontal axis (33b). By means of the pivot and slant devices the laying device and the laying depth are controlled.

LIST OF REFERENCE NUMERALS 1 soil of the ground
2 soil surface
3 laying device
4 part for engagement of the pushing or pulling force for movement of the device
5 cutting device, vertical blade
6 device for dispensing a media line
7 device for dispensing a group of media lines comprised of two media lines
8 semi-circularly designed cutting device
9 cutting device, horizontal blade
12a precutting device, left vertical blade
12b precutting device, right vertical blade
15 obstacle in the ground
16a impinging wave front from sender to obstacle
16b reflected wave front of the obstacle to the receiver
17 sender
18 receiver
19a impinging wave front from sender to obstacle
19b weakened wave front after having passed the obstacle and traveling to the sender
20 stationary measuring site
21 individual media line
22 two adjacently positioned media lines
31 pivot and slant possibilities of the horizontal blade about a horizontal axis
32a pivot possibility of the left vertical blade about a vertical axis
32b pivot possibility of the right vertical blade about the vertical axis
33a pivot/slant possibility of the support device about a vertical axis
33b pivot/slant possibility of the support device about a horizontal axis
41 trench for positioning the laying device (head trench)
42 tractor
51 wedge-shaped configuration of the horizontal and vertical blades for facilitating penetration of the ground
A, B, C planes in which groups of media lines are laid within the ground

What is claimed is:

1. A laying device for simultaneous laying at least two substantially parallel and axially spaced apart groups of flexible media lines in at least one flat layer in the soil, wherein each group of flexible media lines comprises at least one flexible media line; the laying device comprising:
   a cutting device for generating at least one slot in the ground in a cutting direction of the cutting device through the ground;
   wherein the cutting device has one or more substantially vertical blades and a substantially horizontal blade directly connected to a lower end of the one or more vertical blades, or the cutting device, when the cutting device is viewed in a projection onto a plane that is perpendicular to the cutting direction, has a round, semi-circular, oval, polygonal or Y-shaped configuration;
   at least two devices for dispensing the groups of media lines into the at least one slot, the at least two devices arranged on the side of the laying device facing in a direction opposite to the cutting direction.

2. The laying device according to claim 1, wherein a horizontal and/or vertical slant of the cutting device or of parts of the cutting device is adjustable.

3. The laying device according to claim 1, wherein the cutting device is loaded by vibrations, oscillations or shaking movements.

4. The laying device according to claim 1, wherein between the cutting device and the ground a friction-reducing means is introduced.

5. The laying device according to claim 1, further comprising a precutting device that, viewed in a laying direction, is arranged in front of the cutting device, wherein the precutting device has blades having an arrangement corresponding completely or partially to the arrangement of the cutting blades of the cutting device.

6. The laying device according to claim 5, wherein, viewed in the laying direction, the precutting device is arranged at a front side of the laying device and the cutting device at a rear side of the laying device.

7. The laying device according to claim 1, comprising a support device, wherein the cutting device is arranged on the support device.

8. The laying device according to claim 7, wherein horizontal and/or vertical guiding movements of the cutting device are realized by horizontal and/or vertical slanting movements of the support device.

9. The laying device according to claim 1, wherein horizontal and/or vertical guiding movements of the cutting device are realized by horizontal and/or vertical slanting movements and/or pivot movements of the horizontal and vertical blades.

10. The laying device according to claim 1, wherein the groups of media lines are guided in the interior of the cutting device to the devices for dispensing the groups of media lines, wherein the at least two devices for dispensing are mounted on the cutting device.

11. The laying device according to claim 1, wherein the media lines are ready-made and packaged in exchangeable prepackaged units that are carried on the laying device, wherein the media lines are guided from the prepackaged units to the cutting device.

12. The laying device according to claim 1, comprising sensors comprised of senders and receivers for sound or electromagnetic waves for detecting obstacles in the ground.

13. The laying device according to claim 12, wherein the senders and/or receivers for sound or electromagnetic waves are arranged on the cutting device and/or on a precutting device provided on the laying device.

14. The laying device according to claim 13, wherein the senders and/or receivers interact with senders and/or receivers arranged on a parallel-guided laying device.

15. The laying device according to claim 13, wherein the senders and/or receivers for sound or electromagnetic waves interact with senders and/or receivers arranged for sound or electromagnetic waves arranged at stationary measuring sites on the ground or in the ground.

16. A method for surface-near laying of axially spaced apart groups of flexible media lines by means of a laying device for simultaneous laying at least two substantially parallel and axially spaced apart groups of flexible media lines in at least one flat layer in the soil, wherein each group of flexible media lines comprises at least one flexible media line and wherein the laying device comprises a cutting device for generating at least one slot in the ground in a cutting direction of the cutting device through the ground, wherein the cutting device has one or more substantially vertical blades and a substantially horizontal blade directly connected to a lower end of the one or more vertical blades, or the cutting device, when the cutting device is viewed in a projection onto a plane that is perpendicular to the cutting direction, has a round, semi-circular, oval, polygonal or Y-shaped configuration; and at least two devices for dispensing the groups of media lines arranged on the side of the laying device that is facing in a direction opposite to the cutting direction; the method comprising the steps of:
   generating at least one slot in the ground with the cutting device of the laying device;
   dispensing through the cutting device at least two groups of media lines into the at least one slot at a side of the laying device opposite the cutting direction.

17. The method according to claim 16, further comprising the step of performing physical soil exploration in the ground by sending and receiving sound or electromagnetic waves.

18. The method according to claim 16, comprising, before generating the at least one slot, the step of loosening the soil by a precutting device at least partially at locations that are to be cut by the cutting device.

19. The method according to claim 16, comprising the step of varying the laying depth at predetermined laying positions.

20. The method according to claim 16, wherein the media lines are drainage pipes or heat exchanger pipes.

21. The method according to claim 16, repeating at different soil depths the steps of generating at least one slot in the ground and dispensing at least two groups of media lines, wherein the laying device performs each subsequent laying process at a reduced soil depth as compared to the preceding laying process.

\* \* \* \* \*